US012736961B1

(12) United States Patent
Hansen et al.

(10) Patent No.: US 12,736,961 B1
(45) Date of Patent: Sep. 15, 2026

(54) ROAD SIGN VERIFICATION IN AUTONOMOUS VEHICLE REMOTE TELEASSIST SYSTEM

(71) Applicant: Aurora Operations, Inc., Mountain View, CA (US)

(72) Inventors: Andreas Hansen, Mountain View, CA (US); Niels Joubert, Los Altos, CA (US); Brian Taylor, Alameda, CA (US)

(73) Assignee: Aurora Operations, Inc., Pittsburgh, PA (US)

( * ) Notice: Subject to any disclaimer, the term of this patent is extended or adjusted under 35 U.S.C. 154(b) by 633 days.

(21) Appl. No.: 18/090,353

(22) Filed: Dec. 28, 2022

(51) Int. Cl.

| | |
|---|---|
| ***G05D 1/00*** | (2024.01) |
| ***G06V 10/26*** | (2022.01) |
| ***G06V 20/58*** | (2022.01) |

(52) U.S. Cl.
CPC ......... *G05D 1/0038* (2013.01); *G05D 1/0223* (2013.01); *G05D 1/0246* (2013.01); *G05D 1/0274* (2013.01); *G06V 10/26* (2022.01); *G06V 20/582* (2022.01)

(58) Field of Classification Search
CPC .. G05D 1/0038; G05D 1/0223; G05D 1/0246; G05D 1/0274; G06V 10/26; G06V 20/582
See application file for complete search history.

(56) References Cited

U.S. PATENT DOCUMENTS

| | | | | | |
|---|---|---|---|---|---|
| 6,560,529 | B1 * | 5/2003 | Janssen | .............. | G08G 1/09675 340/988 |
| 10,293,818 | B2 * | 5/2019 | Kroop | .................. | G05D 1/0246 |
| 10,607,094 | B2 * | 3/2020 | Kunze | .................. | G06V 20/582 |
| 2019/0179320 | A1 * | 6/2019 | Pacala | .................... | G01C 21/30 |
| 2020/0317218 | A1 * | 10/2020 | Mao | ....................... | B60K 31/18 |
| 2020/0320676 | A1 * | 10/2020 | Hardy | ................ | G08G 1/09623 |
| 2020/0359181 | A1 * | 11/2020 | Kusumoto | .............. | H04W 4/44 |
| 2023/0058082 | A1 * | 2/2023 | Kim | ................... | G06V 10/7788 |

* cited by examiner

*Primary Examiner* — Scott A Browne
*Assistant Examiner* — Shahira Baajour
(74) *Attorney, Agent, or Firm* — Gray Ice Higdon

(57) ABSTRACT

A teleassist system may be used to assist with verifying road signs encountered by an autonomous vehicle, particularly road signs that may be new and/or temporary in nature, e.g., within construction zones, and thus not maintained in a map database utilized by the autonomous vehicle. Detection of an unmapped road sign by an autonomous vehicle, for example, may be used to initiate a teleassist session with a remote teleassist operator to facilitate autonomous vehicle compliance with the unmapped road sign.

18 Claims, 9 Drawing Sheets

ROAD SIGN VERIFICATION IN AUTONOMOUS VEHICLE REMOTE TELEASSIST SYSTEM

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate map data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

It has also been proposed to utilize teleassist to complement vehicle autonomy, particularly for use in connection with handling certain irregular conditions that an autonomous vehicle may encounter within an environment. Events such as construction-related lane or road closures, funeral processions, emergency vehicles, loading or unloading school buses, crossing guards, police officers directing traffic, etc., while potentially uncommon, will still inevitably be encountered by autonomous vehicles from time to time, thus requiring autonomous vehicles to handle such events in a reliable manner. With teleassist, a remote system or operator may be placed in communication with an autonomous vehicle to assist with resolving any such events, and as such, it is desirable for a teleassist system to efficiently and reliably support teleassist for autonomous vehicles.

SUMMARY

The present disclosure is related to facilitating interaction between an autonomous vehicle and a teleassist system. A teleassist system may be used in some implementations to assist with verifying road signs encountered by an autonomous vehicle, particularly road signs that may be new and/or temporary in nature, e.g., within construction zones, and thus not maintained in a map database utilized by the autonomous vehicle. Detection of an unmapped road sign by an autonomous vehicle, for example, may be used to initiate a teleassist session with a remote teleassist operator to facilitate autonomous vehicle compliance with the unmapped road sign.

Therefore, consistent with one aspect of the invention, an autonomous vehicle control system may include one or more processors configured to operate an autonomous vehicle in an environment by detecting a road sign in the environment from sensor data captured by a sensor disposed on the autonomous vehicle, accessing a map database storing sign data for a plurality of road signs in the environment within which the autonomous vehicle is operated to determine that the detected road sign is not stored in the map database, and in response to determining that the detected road sign is not stored in the map database, initiating a teleassist session with a remote teleassist system to receive remote teleassist operator input that suggests a vehicle control operation to control operation of the autonomous vehicle to comply with the detected road sign.

Also, in some embodiments, the one or more processors are further configured to execute the vehicle control operation suggested by the teleassist operator input received from the remote teleassist system. In addition, in some embodiments, the sensor data includes an image captured from a field of view of the sensor, and the one or more processors are further configured to, after initiating the teleassist session, communicate at least a portion of the image to the remote teleassist system.

In some embodiments, the one or more processors are further configured to crop the image to generate a cropped image including the detected road sign, and to communicate the at least a portion of the image to the remote teleassist system by communicating the cropped image to the remote teleassist system. In addition, in some embodiments, the detected road sign is a first detected road sign and the one or more processors are further configured to detect a second road sign in the environment proximate the first detected road sign and to crop the image to include both of the first and second detected road signs in the cropped image. Also, in some embodiments, the detected road sign is a first detected road sign, the cropped image is a first cropped image, and the one or more processors are further configured to detect a second road sign in the environment proximate the first detected road sign, to generate a second cropped image including the second detected road sign, and to communicate the at least a portion of the image to the remote teleassist system by communicating a sequence of the first and second cropped images to the remote teleassist system.

In addition, in some embodiments, the one or more processors are configured to communicate a notification for the detected road sign to the remote teleassist system during the teleassist session to provide situational awareness about the detected road sign to a teleassist operator of the remote teleassist system. In some embodiments, the detected road sign is a first detected road sign and the one or more processors are further configured to detect a second road sign in the environment proximate the first detected road sign, and the notification is an aggregated notification for both of the first and second detected road signs. Further, in some embodiments, the detected road sign is a first detected road sign, the notification is a first notification and the one or more processors are further configured to detect a second road sign in the environment proximate the first detected road sign, and to communicate a sequence of the first notification and a second notification for the second detected road sign to the remote teleassist system during the teleassist session.

In addition, in some embodiments, the one or more processors are configured to determine a speed limit associated with the detected road sign that is lower than a current speed limit set for the autonomous vehicle, and to lower the current speed limit for the autonomous vehicle based upon the determined speed limit associated with the detected road sign. Further, in some embodiments, the detected road sign does not explicitly specify a speed limit, and the one or more processors are configured to determine a cautionary condition associated with the detected road sign, and to lower the current speed limit for the autonomous vehicle based upon the determined cautionary condition associated with the detected road sign.

Moreover, in some embodiments, the one or more processors are configured to notify the remote teleassist system of the lowering of the current speed limit. Further, in some embodiments, the one or more processors are configured to notify the remote teleassist system by generating a notification identifying the detected road sign and the speed limit to which the autonomous vehicle is being lowered.

In some embodiments, the vehicle control operation suggested by the remote teleassist operator input specifies a speed limit to which the autonomous vehicle is to be set. Moreover, in some embodiments, the one or more processors are configured to notify the remote teleassist system by generating a question identifying the detected road sign and the speed limit to which the autonomous vehicle is being lowered. Further, in some embodiments, the remote teleassist operator input answers the question by confirming, rejecting, modifying the lowering of the speed limit to which the autonomous vehicle is being lowered.

In addition, in some embodiments, the one or more processors are configured to determine a speed limit associated with the detected road sign and to notify the remote teleassist system of the determined speed limit, and the vehicle control operation suggested by the remote teleassist operator input specifies a speed limit to which the autonomous vehicle is to be set. Also, in some embodiments, the one or more processors are configured to determine a speed limit associated with the detected road sign and to notify the remote teleassist system of the determined speed limit, and the remote teleassist operator input confirms or rejects the determined speed limit. Moreover, in some embodiments, the one or more processors are configured to maintain the teleassist session with the remote teleassist system active until receiving remote teleassist operator input to close the teleassist session.

In some embodiments, the detected road sign is a first road sign, and the one or more processors are configured to detect a second road sign in the environment, determine from the map database that the second detected road sign is stored in the map database, determine that a speed limit for the second detected road sign is greater than a current speed limit set for the autonomous vehicle, and request confirmation from the remote teleassist system to increase the current speed limit for the autonomous vehicle to that of the second detected road sign.

Consistent with another aspect of the invention, a method of operating an autonomous vehicle in an environment may include detecting a road sign in the environment from sensor data captured by a sensor disposed on the autonomous vehicle, accessing a map database storing sign data for a plurality of road signs in the environment within which the autonomous vehicle is operated to determine that the detected road sign is not stored in the map database, and in response to determining that the detected road sign is not stored in the map database, initiating a teleassist session with a remote teleassist system to receive remote teleassist operator input that suggests a vehicle control operation to control operation of the autonomous vehicle to comply with the detected road sign.

Consistent with another aspect of the invention, a teleassist system that is remote to an autonomous vehicle operating in an environment may include one or more processors configured to create a teleassist session with the autonomous vehicle in response to receiving a request from the autonomous vehicle triggered in response to the autonomous vehicle detecting a road sign in the environment from sensor data captured by a sensor disposed on the autonomous vehicle and determined to be an unmapped road sign that is not stored in a map database of the autonomous vehicle, provide a teleassist operator with situational awareness information associated with the detected road sign using a user interface, and in response to user input from the teleassist operator through the user interface, communicate to the autonomous vehicle teleassist operator input that suggests a vehicle control operation to control operation of the autonomous vehicle to comply with the detected road sign.

Further, in some embodiments, the user input from the teleassist operator confirms the detected road sign, rejects the detected road sign, or specifies a speed limit to which the autonomous vehicle is to be set.

Some implementations may also include an autonomous vehicle and/or a system that is remotely located from an autonomous vehicle and includes one or more processors that are configured to perform various of the methods and or incorporate the functionality of an autonomous vehicle control system described above. Some implementations may also include an autonomous vehicle control system including one or more processors, a computer readable storage medium, and computer instructions resident in the computer readable storage medium and executable by the one or more processors to perform various of the methods described above. Still other implementations may include a non-transitory computer readable storage medium that stores computer instructions executable by one or more processors to perform various of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The various implementations discussed hereinafter are generally directed to a teleassist system for use with an autonomous vehicle and incorporating road sign verification consistent with the invention. Prior to a discussion of these implementations, however, an example hardware and software environment within which the various techniques disclosed herein may be implemented will be discussed.

Hardware and Software Environment

Figure 1:
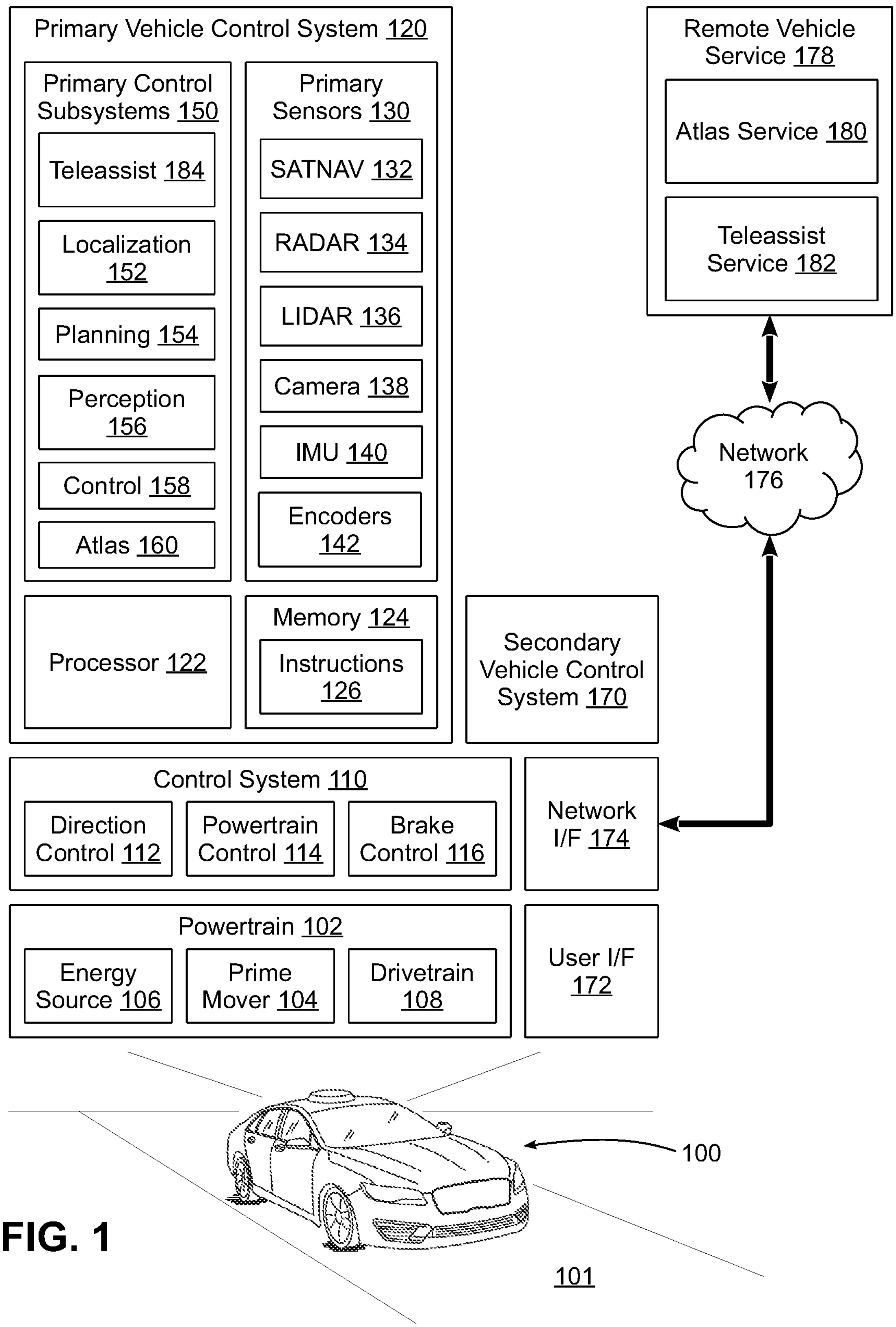
FIG. 1 illustrates an example hardware and software environment for an autonomous vehicle.

Turning to the Drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include a powertrain 102 including a prime mover 104 powered by an energy source 106 and capable of providing power to a drivetrain 108, as well as a control system 110 including a direction control 112, a powertrain control 114 and brake control 116. Vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others), while energy source 106 may include a fuel system (e.g., providing gasoline, diesel, hydrogen, etc.), a battery system, solar panels or other renewable energy source, a fuel cell system, etc., and drivetrain 108 may include wheels and/or tires along with a transmission and/or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances multiple electric motors (e.g., dedicated to individual wheels or axles) may be used as a prime mover. In the case of a hydrogen fuel cell implementation, the prime mover may include one or more electric motors and the energy source may include a fuel cell system powered by hydrogen fuel.

Direction control 112 may include one or more actuators and/or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (which may include various degrees of autonomy as well as selectively autonomous functionality) is primarily implemented in a primary vehicle control system 120, which may include one or more processors 122 and one or more memories 124, with each processor 122 configured to execute program code instructions 126 stored in a memory 124.

A primary sensor system 130 may include various sensors suitable for collecting information from a vehicle's surrounding environment for use in controlling the operation of the vehicle. For example, a satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection And Ranging (RADAR) and Light Detection and Ranging (LIDAR) sensors 134, 136, as well as a digital camera 138 (which may include various types of image capture devices capable of capturing still and/or video imagery), may be used to sense stationary and moving objects within the immediate vicinity of a vehicle. An inertial measurement unit (IMU) 140 may include multiple gyroscopes and accelerometers capable of detection linear and rotational motion of a vehicle in three directions, while one or more wheel encoders 142 may be used to monitor the rotation of one or more wheels of vehicle 100.

The outputs of sensors 132-142 may be provided to a set of primary control subsystems 150, including, a localization subsystem 152, a planning subsystem 154, a perception subsystem 156, and a control subsystem 158. Localization subsystem 152 is principally responsible for precisely determining the location and orientation (also sometimes referred to as "pose", which in some instances may also include one or more velocities and/or accelerations) of vehicle 100 within its surrounding environment, and generally within some frame of reference. Planning subsystem 154 is principally responsible for planning a path of motion for vehicle 100 over some timeframe given a desired destination as well as the static and moving objects within the environment, while perception subsystem 156 is principally responsible for detecting, tracking and/or identifying elements within the environment surrounding vehicle 100. Control subsystem 158 is principally responsible for generating suitable control signals for controlling the various controls in control system 110 in order to implement the planned path of the vehicle. Any or all of localization subsystem 152, planning subsystem 154, perception subsystem 156, and control subsystem 158 may have associated data that is generated and/or utilized in connection with the operation thereof, and that which may be communicated to a teleassist system in some implementations.

In addition, an atlas or map subsystem 160 may be provided in the illustrated implementations to describe the elements within an environment and the relationships therebetween. Atlas subsystem 160 may be accessed by each of the localization, planning and perception subsystems 152-156 to obtain various information about the environment for use in performing their respective functions. Atlas subsystem 160 may be used to provide map data to the autonomous vehicle control system, which may be used for various purposes in an autonomous vehicle, including for localization, planning, and perception, among other purposes. Map data may be used, for example, to lay out or place elements within a particular geographical area, including, for example, elements that represent real world objects such as roadways, boundaries (e.g., barriers, lane dividers, medians, etc.), buildings, traffic devices (e.g., traffic or road signs, lights, etc.), as well as elements that are more logical or virtual in nature, e.g., elements that represent valid pathways a vehicle may take within an environment, "virtual" boundaries such as lane markings, or elements that represent logical collections or sets of other elements. Map data may also include data that characterizes or otherwise describes elements in an environment (e.g., data describing the geometry, dimensions, shape, etc. of objects), or data that describes the type, function, operation, purpose, etc., of elements in an environment (e.g., speed limits, lane restrictions, traffic device operations or logic, etc.). In some implementations, atlas subsystem 160 may provide map data in a format in which the positions of at least some of the elements in a geographical area are defined principally based upon relative positioning between elements rather than any absolute positioning within a global coordinate system. It will be appreciated, however, that other atlas or map systems suitable for maintaining map data for use by autonomous vehicles may be used in other implementations, including systems based upon absolute positioning. Furthermore, it will be appreciated that at least some of the map data that is generated and/or utilized by atlas subsystem 160 may be communicated to a teleassist system in some implementations.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-160 are illustrated as being separate from processors 122 and memory 124, it will be appreciated that in some implementations, some or all of the functionality of a subsystem 152-160 may be implemented with program code instructions 126 resident in one or more memories 124 and executed by one or more processors 122, and that these subsystems 152-160 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in primary vehicle control system 120 may be networked in various manners.

In some implementations, vehicle 100 may also include a secondary vehicle control system 170, which may be used as a redundant or backup control system for vehicle 100. In some implementations, secondary vehicle control system 170 may be capable of fully operating autonomous vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include a user interface 172 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface, e.g., from a remote operator.

Moreover, vehicle 100 may include one or more network interfaces, e.g., network interface 174, suitable for communicating with one or more networks 176 (e.g., a LAN, a WAN, a wireless network, and/or the Internet, among others) to permit the communication of information with other vehicles, computers and/or electronic devices, including, for example, a central service, such as a cloud service, from which vehicle 100 receives environmental and other data for use in autonomous control thereof. In the illustrated implementations, for example, vehicle 100 may be in communication with a cloud-based remote vehicle service 178 including, at least for the purposes of implementing various functions described herein, an atlas or map service or system 180 and a teleassist service or system 182. Atlas or map service or system 180 may be used, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. Teleassist service or system 182 may be used, for example, to provide teleassist support to vehicle 100, e.g., through communication with a teleassist subsystem 184 resident in primary vehicle control system 120, as will be discussed in greater detail below.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Teleassist System

Operating an autonomous vehicle in the complex and dynamic environments within which automobiles regularly operate often necessitates handling a diverse array of conditions that, while comparatively uncommon, are still regularly encountered by many autonomous vehicles over time. Autonomously handling these uncommon conditions in a performant way can be challenging, and some proposed approaches to addressing these uncommon conditions incorporate the use of teleassist, or "human-in-the-loop" technology, to enable a human operator, who may be remote from the vehicle, to make decisions and assist in guiding a vehicle whenever some of these uncommon conditions are encountered by the vehicle.

Some proposed teleassist approaches focus on direct control of a vehicle by a remote operator, whereby the operator is provided with sensor data collected by the vehicle and is able to directly control the vehicle from a remote location. It has been found, however, that direct control of a vehicle in such circumstances generally requires a fast, responsive and reliable network connection between the remote operator and the autonomous vehicle. Network connectivity and latency for an autonomous vehicle, however, can vary considerably based upon location (e.g., urban or rural, highway or side road, etc.) and network congestion. In addition, remote operators, even when provided with sensor data collected by a vehicle, may still lack full situational awareness due to the fact that they are not physically within the vehicle.

The disclosed implementations, on the other hand, focus on an indirect control methodology whereby a teleassist service is able to provide suggestions or recommendations to an autonomous vehicle, while requiring any such directives or recommendations to be validated by the autonomous vehicle prior to being implemented. By doing so, performance of the vehicle may be effectively decoupled from the performance of the network that links the teleassist service with the autonomous vehicle.

Figure 2:
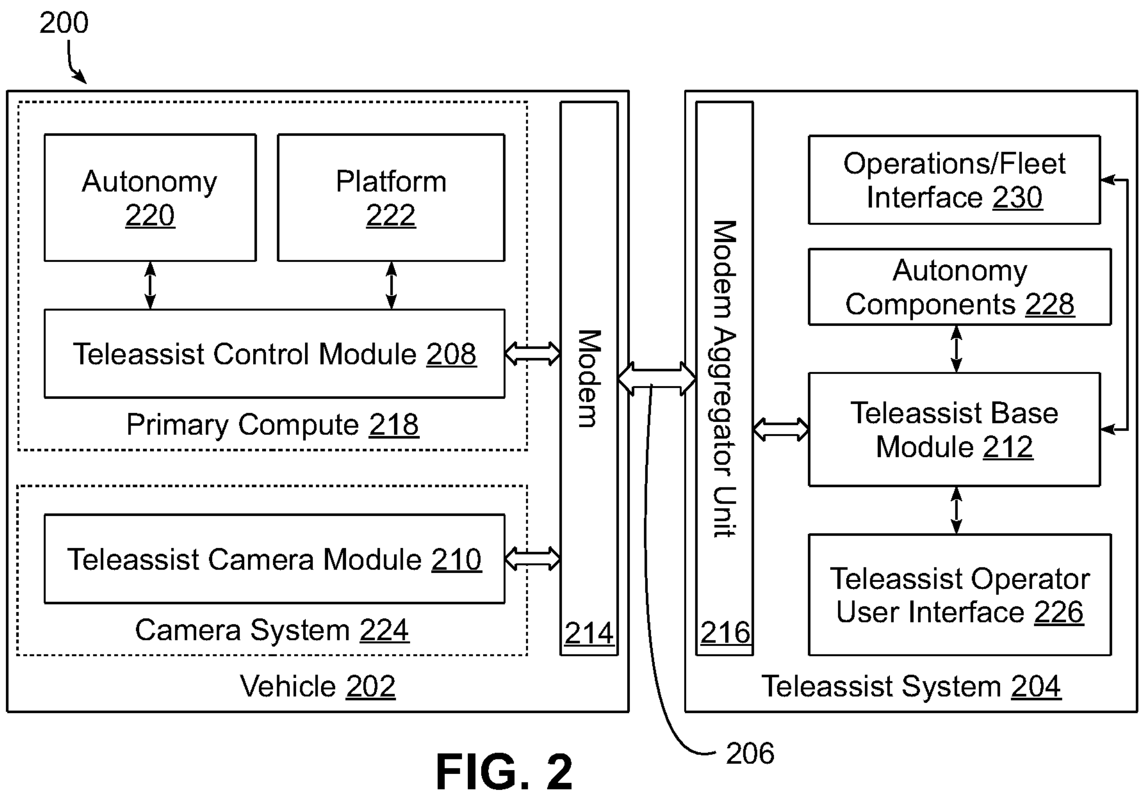
FIG. 2 is a block diagram illustrating an example teleassist-enabled system consistent with some implementations.

FIG. 2, for example, illustrates one example implementation of a teleassist-enabled system or service 200 whereby an autonomous vehicle 202 interfaces with a remote teleassist system 204 over a network 206. Remote teleassist system 204 may be physically remote from autonomous vehicle 202, and will generally support interfacing with multiple vehicles to enable multiple teleassist operators to concurrently interact with multiple vehicles. As will become more apparent below, teleassist operators may actively and continuously monitor individual vehicles in some implementations, while in other implementations, individual teleassist operators may interact with multiple vehicles at different times, e.g., so that a particular operator may support multiple vehicles at one time. In some implementations, for example, teleassist operators may be selectively coupled to particular autonomous vehicles on an on-demand basis, e.g., in response to requests generated by the vehicles whenever certain conditions (e.g., various uncommon situations that may benefit from teleassist support) arise. In some implementations, a pool of operators may support a pool of autonomous vehicles, and a teleassist system may initiate teleassist sessions on an on-demand basis, e.g., based upon requests initiated by autonomous vehicles, the teleassist system, or both.

Teleassist support may be implemented in some implementations using a teleassist control module 208 and a teleassist camera module 210 in autonomous vehicle 202 in communication with a teleassist base module 212 in teleassist system 204. Modules 208 and 210 of vehicle 202 may be coupled to network 206 through a modem 214, while module 212 of teleassist system 204 may be coupled to network 206 through a modem aggregator unit 216 capable of communicating with multiple modems 214 of multiple autonomous vehicles 202. Network 206 may be implemented in part using a wireless network such as a 4G, LTE or 5G network, a satellite network, or some combination thereof, although the invention is not so limited.

Teleassist control module 208 may be resident in some implementations within a primary compute system 218 of vehicle 202, and may interface with each of an autonomy system 220 and platform 222 of the vehicle to collect and stream data from the primary compute system to teleassist system 204 as well as receive and process operator inputs received from teleassist system 204. In some implementations, primary compute system 218 may be implemented in a similar manner to primary vehicle control system 120 illustrated in FIG. 1, with autonomy system 220 representing high level autonomous control subsystems such as localization, planning, perception, etc., and with platform 222 representing lower level vehicle controls such as provided by control subsystem 158. However, it will be appreciated that teleassist control module 208 may interface with any autonomy or control-related aspect of vehicle 202 in other implementations.

Teleassist camera module 210 may be resident in some implementations within a camera system 224 that manages the on-board cameras on vehicle 202, and module 210 may, in some implementations, stream camera feed data collected from the on-board cameras to teleassist system 204 for viewing by an operator during a teleassist session. In some implementations module 210 may dynamically vary the data streamed from the on-board cameras, e.g., to vary the priority, quality and/or resolution of each camera feed.

While modules 208 and 210 are implemented separately in FIG. 2, in other implementations, the functionality allocated to each module may vary, or the functionality may be combined into a single module or split into more than two modules. As such, the invention is not limited to the particular architecture illustrated in FIG. 2.

Teleassist base module 212 communicates with modules 208 and 210 during a teleassist session with vehicle 202, and may further manage multiple sessions for multiple vehicles and with multiple operators. Module 212 may also manage scheduling, initiation and termination of sessions in some implementations.

A teleassist operator user interface 226 is coupled to module 212 to provide a user interface through which an operator, e.g., a human operator, may communicate with a vehicle 202 during a session. The user interface may be implemented in any number of suitable manners, and may utilize text, graphics, video, audio, virtual or augmented reality, keyboard input, mouse input, touch input, voice input, gesture input, etc. Dedicated or customized controls and/or indicators may also be used in some implementations. In addition, in some implementations an application, e.g., as may execute on a desktop computer or laptop computer, a mobile device, etc. may be utilized to interact with an operator, while in other implementations a web-based or remote interface may be used. In one example implementation discussed in greater detail below, for example, interface 226 may be a web-based interface that interacts with an operator via a touchscreen display.

Teleassist system 204 may also include one or more autonomy components 228 interfaced with module 212. Autonomy components 228 may include various components that replicate the functionality of similar components in vehicle 202 and/or that are also accessible to a vehicle for use in connection with the primary control of the vehicle (e.g., components 240, 242 and 244 discussed below in connection with FIG. 3). For example, in some implementations, module 212 may have access to the same map data utilized by each vehicle, e.g., as provided by an atlas system as described above, as well as to similar layout functionality as is used by each vehicle to lay out map data in the immediate vicinity of a vehicle. By doing so, module 212 may effectively reconstruct a digital map of at least the fixed objects in the vicinity around a vehicle without having to receive the entire digital map from the vehicle itself, thereby reducing the volume of data streamed by the vehicle for the purpose of reconstructing the environment around the vehicle. In some implementations, the vehicle may provide a current pose of the vehicle as well as data regarding any dynamic entities detected by the perception system (e.g., other vehicles, pedestrians, or other actors or objects detected in the environment but not represented in the map data), and from this more limited amount of data, a graphical depiction of the immediate vicinity around a vehicle may be generated for display to a teleassist operator. In some implementations, autonomy components may also replicate functionality implemented in vehicle 202 to enable local assessment of how a vehicle may respond to certain directives from the teleassist system, and in some implementations, autonomy components may have similar functionality to that implemented in vehicle 202, but with greater capabilities and/or access to greater computing resources than may be available in the vehicle.

Moreover, in some implementations, a teleassist system may be autonomous in nature as well, whereby the teleassist system is effectively the teleassist operator with which an autonomous vehicle interacts during a teleassist session. In such instances, the teleassist system may assess the current context of an autonomous vehicle and send commands, requests, directives, suggestions, etc. for addressing any conditions that triggered a teleassist session. In some implementations, for example, a teleassist system may have access to more compute power than can practically be provided onboard an autonomous vehicle, and thus the teleassist system may be capable of performing computationally complex evaluations to assist an autonomous vehicle.

Teleassist system 204 may also include an operations/fleet interface 230 to facilitate communication with other services that support autonomous vehicles. For example, it may be desirable in some implementations to provide an ability to request roadside assistance or recovery of an autonomous vehicle, or to provide log data for use in diagnosing vehicle issues. It may also be desirable to propagate data collected during a teleoperation session (e.g., data related to lane closures, detected construction or incidents, etc.) to other vehicles in a fleet. Moreover, data received and/or generated by the teleassist system may be used as training data for further training various components of an autonomous vehicle, e.g., to improve the performance of a detector and reduce the occurrence of false positives, or to improve scenario selection and other decisions made by the autonomous vehicle in response to certain sensor input. Other external services may also interface with a teleassist system in other implementations, as well be apparent to those of ordinary skill having the benefit of the instant disclosure.

Figure 3:
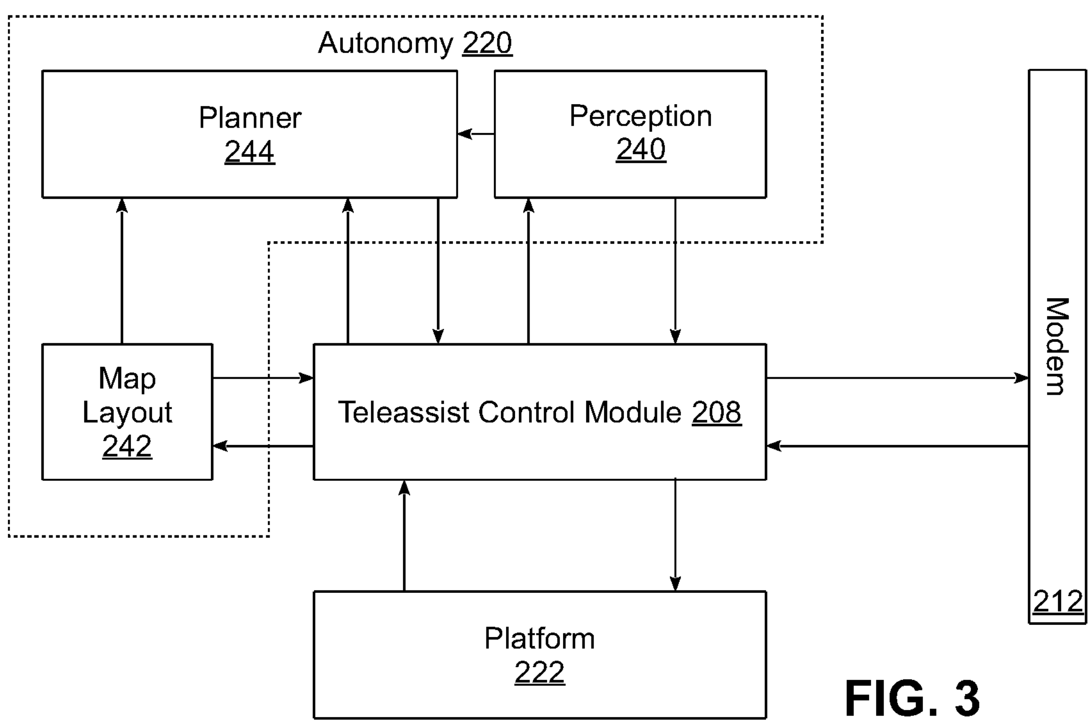
FIG. 3 is a block diagram further illustrating the teleassist control module referenced in FIG. 2.

Now turning to FIG. 3, an example implementation of teleassist control module 208 and the various interfaces supported thereby are illustrated in greater detail. In some implementations, for example, module 208 may include interfaces, e.g., application programming interfaces (APIs) to teleassist system 204 (via modem 214), to platform 222, and to each of a perception component 240, map layout component 242, and planner component 244 of autonomy component 220.

For the interface with teleassist system 204, teleassist control module 208 may be configured to communicate autonomy data (e.g., map data, perception data, route data, planning data), sensor data, telemetry data, etc. to teleassist system 204 to provide the teleassist system with the current status of the vehicle. Teleassist control module 208 may also be configured to communicate various teleassist requests to teleassist system 204 and receive various teleassist commands therefrom. Further, teleassist control module 208 may be configured to receive requests for visualizations and communicate requested visualizations to teleassist system 204.

For the interface with platform 222, teleassist control module 208 may be configured to receive vehicle state information from the platform (e.g., various types of diagnostic and/or sensor data), and to issue various lower level commands to the platform, e.g., to honk a horn, activate or deactivate hazard lights, change gears, decommission the vehicle, initiate a controlled stop, etc.

For the interface with perception component 240, teleassist control module 208 may be configured to receive from the perception component actors and/or tracks of actors detected in the environment, detections by various detectors 246 implemented in the perception component, and other perception-related data. All of such data may be communicated by module 208 to a teleassist system as autonomy data.

For the interface with map layout component 242, teleassist control module 208 may receive, for example, local map data, route data and other map-related data from map layout component 242. Module 208 may also, in some instances, communicate modifications to the information in the map or additional layers of the map to map layout component 242, e.g., to generate lane closures, traffic device overrides, new destinations, virtual path suggestions, etc., or to clear out prior generated map patches applied to the local map stored in component 242, e.g., when a prior lane closure has been removed. Map layout component 242 may also, in some instances, forward map and route updates to planner component 244 to update scenarios being contemplated by the planner component during the operation of the autonomous vehicle.

For the interface with planner component 244, teleassist control module 208 may receive, for example, generated plans, actor properties, alternate scenarios and other planning-related data. Teleassist control module 208 may also forward various teleassist commands to planner component 244, as well as receive teleassist requests and/or feedback to teleassist commands from planner component 244.

Other functionality and variations will be appreciated by those of ordinary skill having the benefit of the instant disclosure. Therefore, the invention is not limited to the specific teleassist system implementations discussed herein.

Unmapped Road Sign Verification

One area in which a teleassist system may be used to enhance the operation of an autonomous vehicle is in interpreting road signs. The vast majority of road signs encountered by an autonomous vehicle may be readily understandable by an autonomous vehicle, as a result of being represented in map data that describes the environment within which the autonomous vehicle operates and/or being detected in the environment by one or more sensors of the autonomous vehicle in circumstances where the intent of the road sign is unambiguous. Traffic control signs such as stop signs, yield signs, crosswalk signs, etc., for example, are generally unambiguous in intent in most situations. Other road signs, however, may be more ambiguous in intent, and may benefit from teleassist operator input to ensure proper adherence to current traffic regulations. Moreover, the real world is constantly in a state of flux, so even if map data is kept relatively current, new road signs may be added in an environment and thus may be detected by an autonomous vehicle despite not being in the map database used by the autonomous vehicle.

Speed limit signs, for example, can be mandatory or advisory, and can have conditions, e.g., time conditions (e.g., 7:00 pm to 7:00 am), vehicle type conditions (e.g., trucks only), lane conditions (e.g., right lane only), construction conditions (e.g., only when workers present). In addition, speed limit signs may be within the field of view of an autonomous vehicle, but may not always be applicable, e.g., where an autonomous vehicle is traveling on a highway and the speed limit sign is on an adjacent frontage road or on an exit ramp not being taken by the autonomous vehicle, or where an existing speed limit sign is within a temporary construction zone and thus is not currently applicable. Multiple speed limit signs, applicable to different situations, may also be placed in close proximity to one another in some circumstances.

In addition, road signs associated with construction zones or other temporary situations (e.g., mowing, landscaping, etc.) may not be represented in map data, and may require relatively complex decision-making in order to ensure that an autonomous vehicle navigates through a construction zone properly, maintaining a proper speed as well as complying with any lane changes or restrictions associated with such situations. In addition, detecting the end of a construction zone or other temporary situation may also be challenging, particularly if no explicit road signs have been set up by workers. Even where an "end work zone" sign has been placed, it may be several more miles before a standard speed limit sign is encountered, so it may still be ambiguous as to what speed limit applies once the end of a construction zone is detected. In addition, in some instances limitations in computer vision systems may only enable a determination that a detected object is a road sign, but not as to exactly what type of road sign has been detected.

For these and other situations, therefore, it may be desirable in some implementations to automatically trigger a teleassist session with a remote teleassist system in response to detecting an unmapped road sign, and to provide a teleassist operator with sufficient situational awareness to enable the teleassist operator to provide the autonomous vehicle with teleassist operator input that suggests a vehicle control operation suitable for controlling operation of the autonomous vehicle in a manner that complies with the detected road sign.

An unmapped road sign, in this regard, refers to a road sign that is present in the environment of an autonomous vehicle and that is detectable by one or more sensors of the autonomous vehicle, but that is not represented in map data accessible to the autonomous vehicle when the road sign is encountered. Situational awareness generally refers to information provided to a remote teleassist system operator that enables the operator to sufficiently analyze the current situation of the autonomous vehicle, and may include, for example, information such as an image of the road sign and/or other road signs in the vicinity thereof, vehicle telemetry data, one or more video feeds providing a real time view of the environment surrounding the vehicle, and/or any applicable traffic rules as may be maintained in a map database. Teleassist operator input may be considered to include any type of input capable of being generated by a teleassist operator for suggesting a vehicle control operation, e.g., a suggested speed limit to restrict a maximum speed of the autonomous vehicle, a suggested lane to follow, or suggestions to stop or pull over, if appropriate. As will become more apparent below, teleassist operator input in some circumstances may specify particular actions that are recommended (e.g., "set speed limit to 55 mph" or "perform lane change to right lane"), while in other circumstances, may simply confirm or reject a suggestion or action made by the autonomous vehicle (e.g., "reject" after the autonomous vehicle recommends lowering the speed limit to 30 mph after detecting a speed limit sign on an adjacent frontage road). Even when a teleassist operator is presented with confirm and reject options, in some implementations a teleassist operator may be able to modify or update a suggestion or action made by the autonomous vehicle.

In some implementations, an autonomous vehicle may defer acting on a detected unmapped road sign until suitable teleassist operator input is received, while in other implementations, an autonomous vehicle may act on the detected unmapped road sign prior to receiving teleassist operator input, and later adjust its operation once the input is received. In some circumstances, for example, where an unmapped speed limit sign indicates a lower speed limit than is currently applicable to the autonomous vehicle, the autonomous vehicle may elect to use the lower speed limit until instructed otherwise by the remote teleassist operator (e.g., to ignore the speed limit sign if determined to be inapplicable to the autonomous vehicle).

Figure 4:
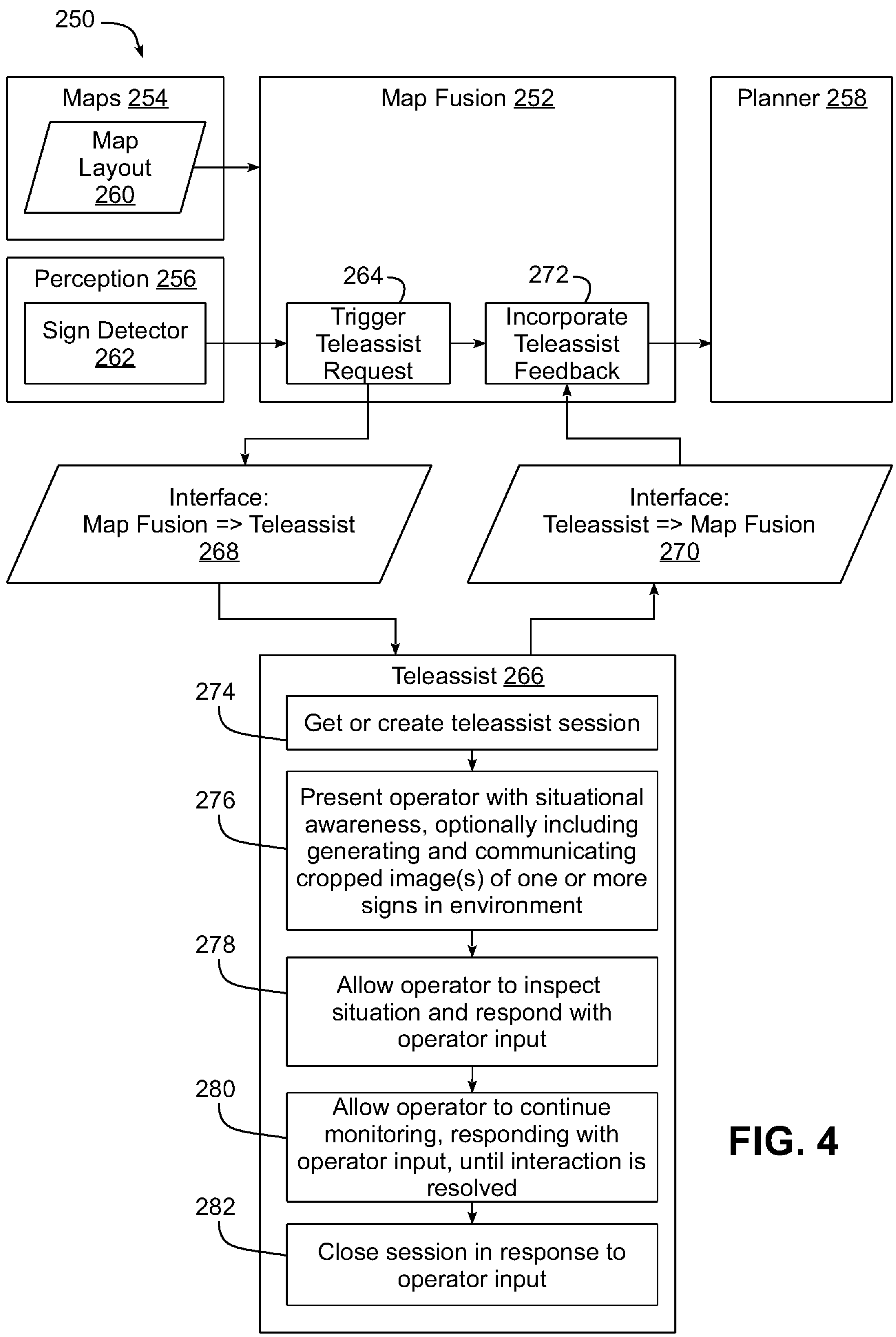
FIG. 4 is a block diagram illustrating an example teleassist-enabled system incorporating road sign verification consistent with some implementations.

FIG. 4 illustrates an example system 250 suitable for performing unmapped road sign verification in some implementations. In this implementation, a map fusion component 252 integrates or fuses various elements mapped in the environment surrounding the autonomous vehicle (e.g., as provided by a map component 254) with various elements currently detected in the environment by a perception component 256 to generate a digital map that may be consumed by a planner component 258 to generate a path to be followed by the autonomous vehicle. Data from the perception component 256 may therefore be used to supplement the stored map data with additional elements detected in the environment and thereby provide a more current representation of the environment surrounding the autonomous vehicle.

Within the context of unmapped road sign verification, for example, map component 254 may provide a map layout 260 that represents the stored static elements in the environment, including any road signs that have been incorporated into the map, while perception component 256 may provide data describing one or more detected road signs, e.g., using a road sign detector 262, which in some implementations may be implemented using a machine learning model trained to detect road signs from image data output by a camera, and which in some implementations may be integrated with other element detectors.

Within map fusion component 252, a detected road sign 262 output by perception component 256 may cause a request for a teleassist session (block 264) to be forwarded to a remote teleassist system 266, with the request being forwarded through an interface 268. Feedback generated by a teleassist operator during the teleassist session may then be received by map fusion component 252 through an interface 270 and incorporated to assist in controlling the autonomous vehicle (block 272). Interfaces 268, 270 (which may be implemented in the same component in some implementations) may be used to respectively communicate data from map fusion component 252 to remote teleassist system 266, e.g., situational awareness information, detected road sign information, etc., and from remote teleassist system 266 back to map fusion component 252, e.g., operator suggestions, commands or requests for additional information.

For example, in response to a detected unmapped road sign that triggers a teleassist request in block 264, remote teleassist system 266 may get or create a teleassist session (block 274) and provide situational awareness information to the teleassist operator (block 276). Within the context of unmapped road sign verification, in some implementations map fusion component 252 may generate one or more cropped images of the various road signs detected in the environment of the autonomous vehicle (e.g., by cropping images captured from the sensors of the autonomous vehicle to incorporate only the detected road signs), along with additional situational awareness information such as vehicle telemetry data and one or more live camera feeds. Once the situational data is provided, the remote teleassist system waits for the operator to assess the situation and provide operator input (block 278), which is then incorporated in block 272 as discussed above. After providing the operator input to the autonomous vehicle, the operator may continue to monitor the operation of the autonomous vehicle and/or provide additional input (block 280) until the teleassist interaction is done, at which point the operator may close the session (block 282).

Figure 5:
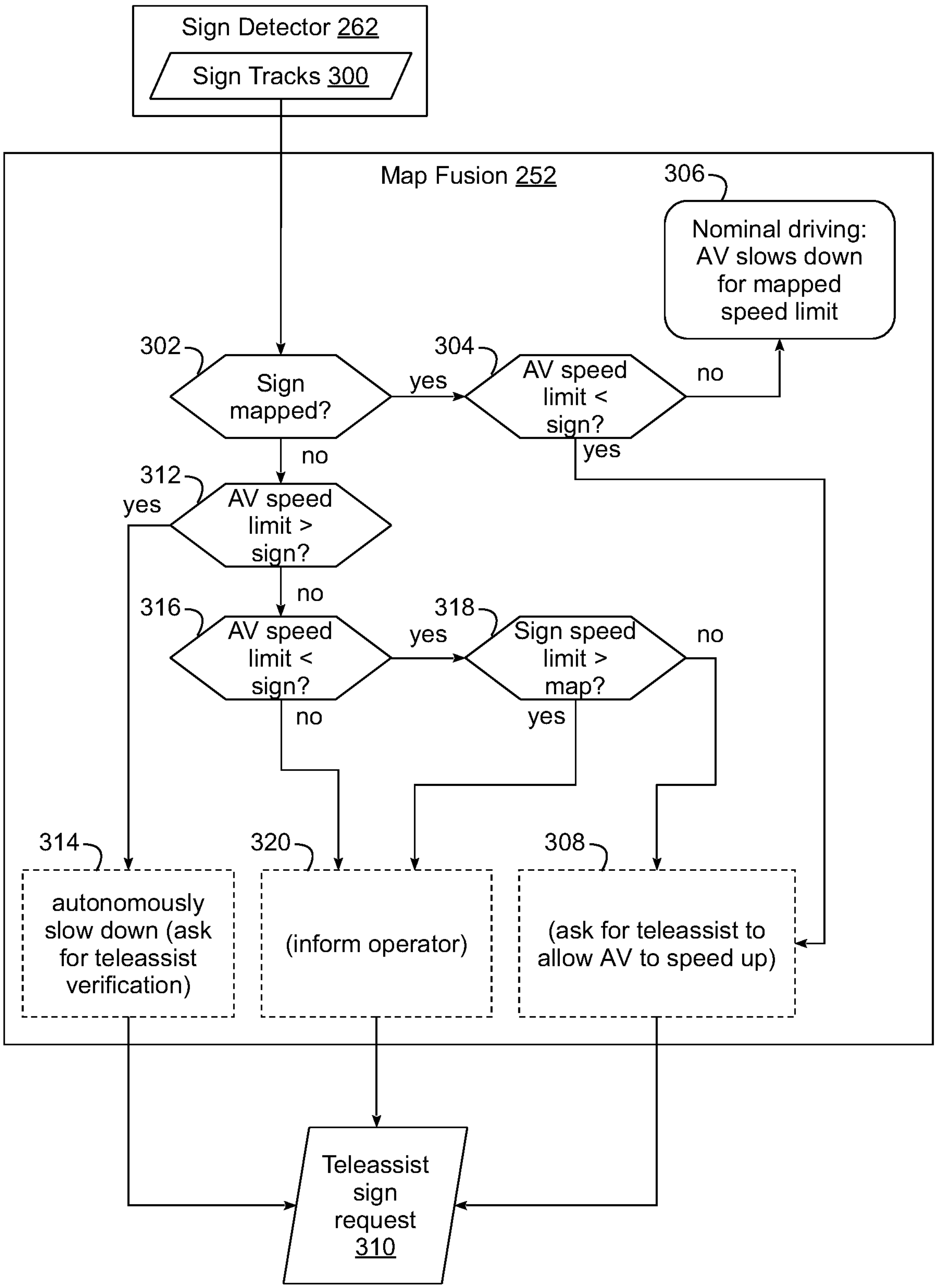
FIG. 5 is a flowchart illustrating an example sequence of operations for triggering a teleassist session in the system of FIG. 4.

FIG. 5 illustrates an example sequence of operations capable of being performed by map fusion component 252 when triggering a teleassist request. In this implementation, a teleassist request may be triggered generally for any unmapped road sign, e.g., to verify a slowdown, to allow for speed up, or to otherwise notify a teleassist operator, and for mapped road signs to allow for speed up. It will be appreciated, however, that other combinations of road signs and/or conditions may be used to trigger a teleassist session in other implementations.

For the sequence, one or more sign tracks 300, each including data describing an associated road sign detected by sign detector 262, is provided to map fusion component 252, which initially determines, for each detected road sign, whether the road sign is mapped (block 302), i.e., whether the road sign matches a road sign stored in the map of the environment surrounding the vehicle. If so, a determination is made in block 304 as to whether the current speed limit set for the autonomous vehicle is less than that specified by the mapped road sign. If not, the current speed limit for the autonomous vehicle may be set to that specified by the mapped road sign, causing the autonomous vehicle to slow down to the new current speed limit (block 306).

If, however, the current speed limit for the autonomous vehicle is less than that specified by the mapped road sign, it may be desirable to request teleassist approval to speed up to the higher speed limit specified by the mapped road sign (block 308), resulting in the generation of an appropriate teleassist sign request 310. In other implementations, however, mapped road signs specifying increased speed limits may not trigger teleassist sign requests, either because the autonomous vehicle may be permitted to increase its speed to the higher speed limit without teleassist assistance, or because the autonomous vehicle may be configured to ignore any road signs specifying increased speed limits.

Returning to block 302, if the road sign is determined to be unmapped, a determination is made as to whether the current speed limit for the autonomous vehicle is greater than that specified by the unmapped road sign (block 312). If so, control passes to block 314, where the current speed limit for the autonomous vehicle is set to that of the road sign and the autonomous vehicle autonomously slows down to the speed limit specified by the road sign, and teleassist verification is requested to confirm whether or not the slowdown is appropriate.

Returning to block 312, if the current speed limit set for the autonomous vehicle is not greater than that specified by the road sign, a determination is made as to whether the current speed limit is less than that specified by the road sign (block 316), and if so, passes control to block 318 to determine whether the speed limit specified by the road sign is greater than the speed limit specified by the map, e.g., by the last mapped speed limit sign encountered by the autonomous vehicle. If not, control passes to block 308, where a request may be initiated for teleassist approval to speed up to the higher speed limit specified by the unmapped road sign.

If, however, the speed limit specified by the road sign is greater than the map speed limit, then a teleassist request may be initiated, but only to notify a teleassist operator (block 320), as the current speed limit set for the autonomous vehicle will otherwise be unchanged absent any later suggestion by the teleassist operator. In addition, returning to block 316, if the current speed limit used by the autonomous vehicle is not less than that specified by the road sign (i.e., the current speed limit equals that specified by the road sign), a teleassist request may be initiated, but only to notify a teleassist operator (block 320), as the current speed limit set for the autonomous vehicle will otherwise be unchanged absent any later suggestion by the teleassist operator.

Once a teleassist session has been initiated, a number of different user interface protocols may be used to provide teleassist operator feedback to an autonomous vehicle.

In one example implementation, referred to herein as a speed limit modulation approach, a teleassist operator may receive unmapped road sign notifications from an autonomous vehicle, enabling a teleassist operator to inspect the notification and situation, and if warranted, respond by resetting the current speed limit for the autonomous vehicle to a specified value through an always available user interface. In another example implementation, referred to herein as a sign validation approach, a teleassist operator may receive explicit questions to verify unmapped road signs from an autonomous vehicle, enabling a teleassist operator to inspect the question and situation, and to respond by selecting an answer from a few available options (e.g. "Yes," "No," "please set the speed limit to _ mph," etc.) provided by the autonomous vehicle. In this approach, the autonomous vehicle interprets and implements the selected answer.

Figure 6:
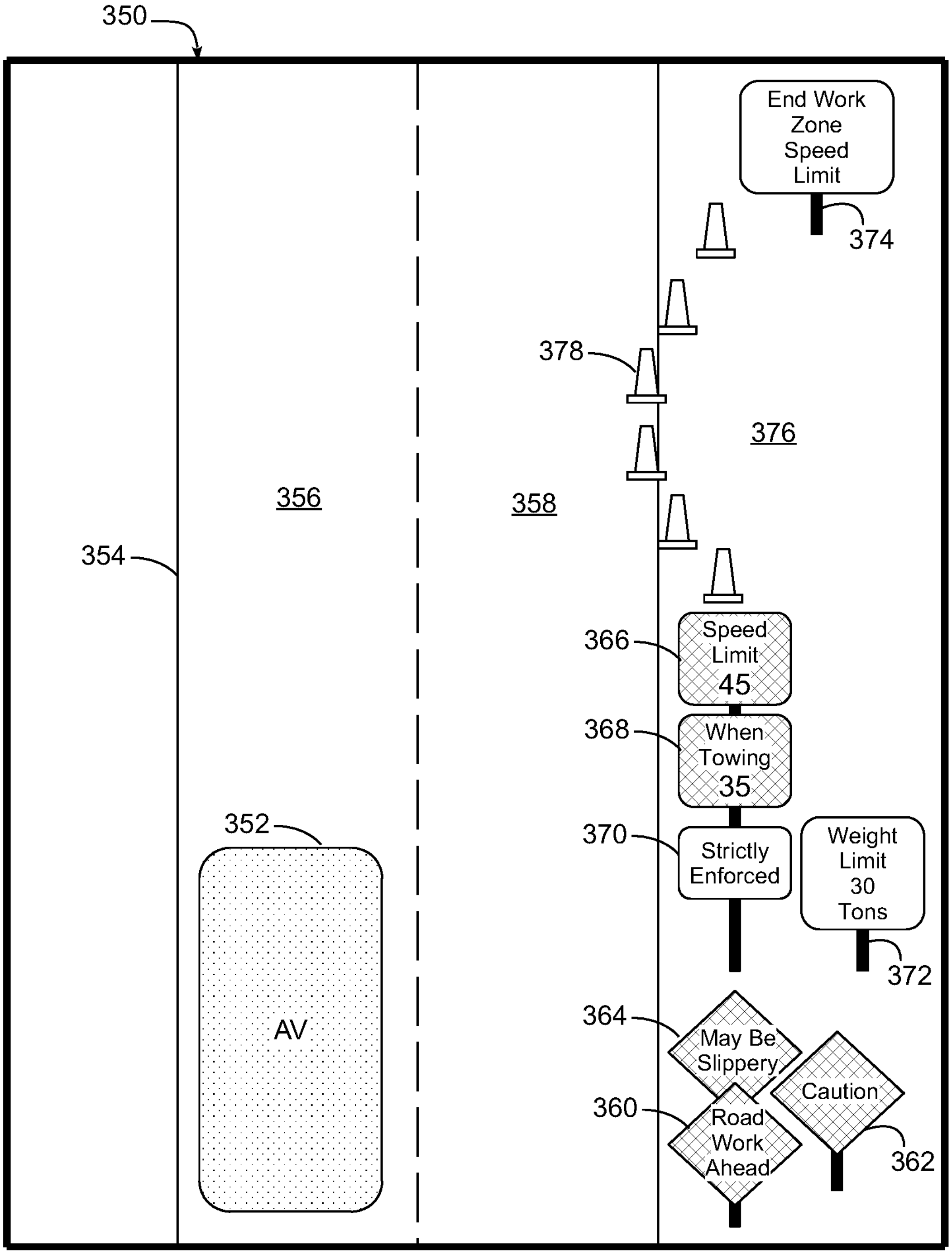
FIG. 6 is a block diagram illustrating an example environment within which road sign verification may be utilized.

FIG. 6, for example, illustrates an environment 350 within which an autonomous vehicle 352 is operating. Environment 350 includes a roadway 354 including a pair of lanes 356, 358 and a series of road signs 360-374 proximate a construction zone 376 delineated by a set of cones 378. For the purposes of this example, the order in which road signs 360-374 are encountered by autonomous vehicle 352 is generally from the bottom of FIG. 6 towards the top of the figure.

A first group or cluster of road signs includes a set of advisory road signs, including a "road work ahead" sign 360 advising that a construction zone may be ahead, a "caution" sign 362 advising the use of caution when driving, and a "may be slippery" sign 364 advising of the possibility of slick driving conditions. A second group or cluster of road signs includes a pair of advisory speed limit signs 366, 368 and a pair of mandatory signs 370, 372. Speed limit sign 366 specifies a speed limit of 45 mph, while speed limit sign 368 specifies a lower, 35 mph speed limit, conditioned on when a vehicle is towing a trailer. Road sign 370 indicates that the speed limits for speed limit signs 366, 368 are strictly enforced, while road sign 372 specifies a maximum weight limit in the construction zone of 30 tons. Road sign 374, disposed at the end of construction zone 376, is a "end work zone speed limit" sign indicating that the construction-related speed limits are no longer applicable and that vehicles may resume normal operating speed for the roadway.

Figure 7:
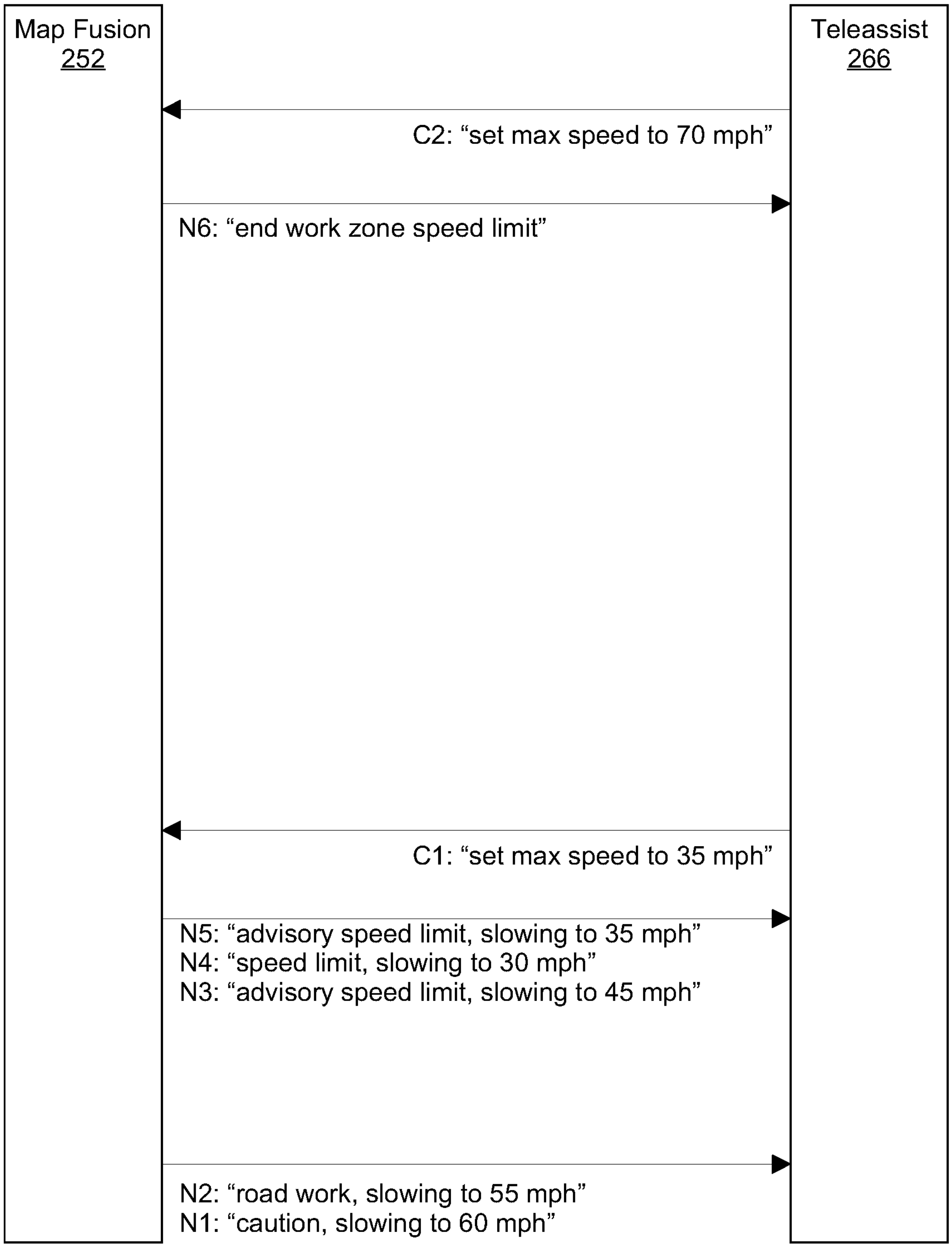
FIG. 7 is a block diagram illustrating an example interaction between the map fusion component and the teleassist system in the system of FIG. 4 using a speed limit modulation approach during autonomous vehicle travel through the environment of FIG. 6.
Figure 8:
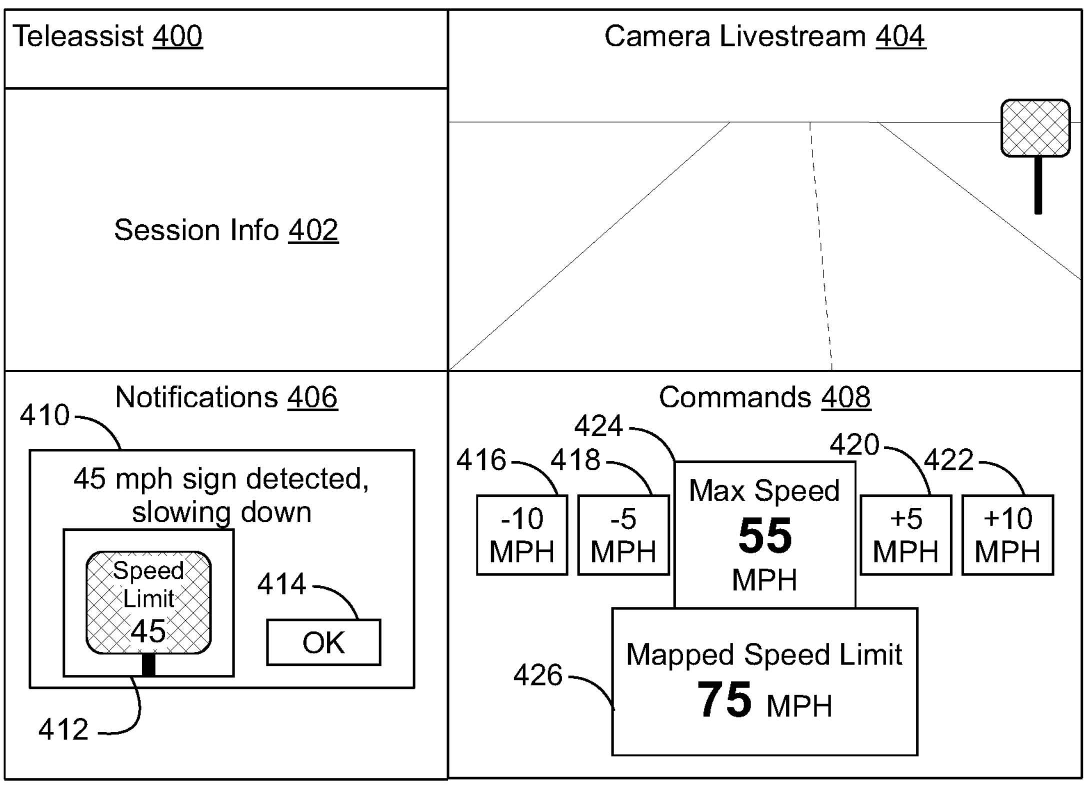
FIG. 8 is a block diagram of an example user interface usable in the system of FIG. 4 when using a speed limit modulation approach.

FIGS. 7-8 illustrate the aforementioned speed limit modulation approach, with FIG. 7 illustrating a set of notifications (N1-N6) sent by map fusion component 252 to remote teleassist system 266 upon encountering the road signs illustrated in FIG. 6, along with a pair of commands (C1-C2) provided as feedback by a teleassist operator to map fusion component 252. FIG. 8 in turn illustrates an example teleassist system user interface 400 that may be displayed to a teleassist operator during a teleassist session to provide situational awareness to the teleassist operator and allow for feedback to be provided to the autonomous vehicle by the teleassist operator.

With this approach, it may be desirable for map fusion component 252 to provide teleassist system 266 with one or more of sign type, whether the road sign is mapped, the speed limit inferred from the road sign, and the timestamp and/or location and bounding box to get a sign snapshot for visualization. A teleassist operator may also be provided with an online or mapped speed limit corresponding to the autonomous vehicle's current position. A teleassist system may provide back to the autonomous vehicle a new speed limit to set for the autonomous vehicle, a timestamp and/or a location where the new speed limit should be applied.

User interface 400, for example, may include a number of panels 402-408 displaying various types of information to the teleassist operator. Panel 402 displays information about the teleassist session, including, for example, operator ID, vehicle ID, session ID, session start time and/or duration, etc. Panel 404 displays situational awareness information forwarded by the autonomous vehicle, e.g., a live camera feed from the vehicle.

Panel 406 displays notifications generated by the autonomous vehicle and forwarded to the teleassist system, while panel 408 displays a number of user interface components (e.g., buttons) that may be utilized by a teleassist operator to provide feedback to the autonomous vehicle. As an example of a notification, panel 406 is illustrated displaying a pop-up window 410 within which is displayed a notification "45 mph sign detected, slowing down." In addition, it may be desirable in some instances to include situational awareness information associated with the notification, e.g., a cropped image 412 of the road sign associated with the notification. It may also be desirable to provide a confirmation ("OK") button 414, or other user interface controls, in order to permit a teleassist operator to confirm that the notification has been received and reviewed by the teleassist operator.

As an example of various commands that may be utilized by a teleassist operator, panel 408 illustrates a set of control buttons 416, 418, 420, 422, that respectively request a change of −10, −5, +5 and +10 mph from the current speed limit set for the autonomous vehicle. Panel 408 may therefore also display additional information, including the current speed limit set for the autonomous vehicle (control 424) and the mapped speed limit (control 426) as specified by the map database used by the autonomous vehicle.

Returning to FIG. 7, and with additional reference to FIG. 6, assume that the autonomous vehicle 352 is a tractor trailer and operating with a speed limit of 70 mph on roadway 354 with a mapped speed limit of 75 mph. It may also be assumed that the road signs 360-374, being associated with a construction zone, are unmapped signs, and thus, upon encountering the road signs, the autonomous vehicle will initiate a teleassist session with remote teleassist system 266. As illustrated in FIG. 7, upon encountering the first cluster of road signs 360-364, road sign 362 may cause the map fusion component 252 to generate a first notification N1 ("caution, slowing to 60 mph") and road sign 360 may generate a second notification N2 ("road work, slowing to 55 mph"), both advising the teleassist operator of the unmapped signs, and indicating the speed limit to which the autonomous vehicle is autonomously reducing its speed (as described above in connection with blocks 312-314 of FIG. 5). Note that while road signs 360 and 362 do not explicitly specify speed limits, in some instances an autonomous vehicle may associate various types of road signs with cautionary conditions (e.g., construction ahead, lane closure ahead, etc.), and these cautionary conditions may in turn be associated with particular speed limits, or alternatively particular reductions in speed limits, in anticipation of a need to operate at a slower speed. Thus, for example, it may be desirable in some instances to assign a 60 mph speed limit (or a −10 change in speed limit) with a "caution" sign and a 55 mph speed limit (or a −15 change in speed limit) with a "road work ahead" sign. Of note, however, in response to notifications N1 and N2, the teleassist operator may determine that the autonomous vehicle has reacted appropriately and that no commands are necessary.

Upon encountering the second cluster of road signs 366-372, the autonomous vehicle may issue three additional notifications N3-N5. Notification N3 indicates that an advisory road sign with a speed limit of 45 mph (road sign 366) has been detected, notification N4 indicates that a road sign with a speed limit of 30 mph (road sign 372) has been detected, and notification N5 indicates that an advisory road sign with a speed limit of 35 mph (road sign 368) has been detected. It should be noted that the autonomous vehicle has misinterpreted road sign 372, which specifies a weight limit of 30 tons, as a speed limit sign, while the autonomous vehicle has not necessarily determined whether the condition of road sign 368 ("when towing") applies to the vehicle. Due to the conflicting information presented by road signs 366, 368 and 372, a teleassist operator may be called upon to determine the proper speed limit to be utilized by the autonomous vehicle, and thus, the teleassist operator may issue a command C1 to instruct the autonomous vehicle to set a speed limit of 35 mph (given that the autonomous vehicle qualifies for the "when towing" condition). In some implementations, a teleassist operator may rely on a video feed or one or more cropped images of the road signs in order to make the determination.

Later, when the autonomous vehicle encounters road sign 374, indicating the end of the work zone, a notification N6 may be generated, and in response, the teleassist operator may issue a command C2 to resume a normal speed of 70 mph.

Figure 9:
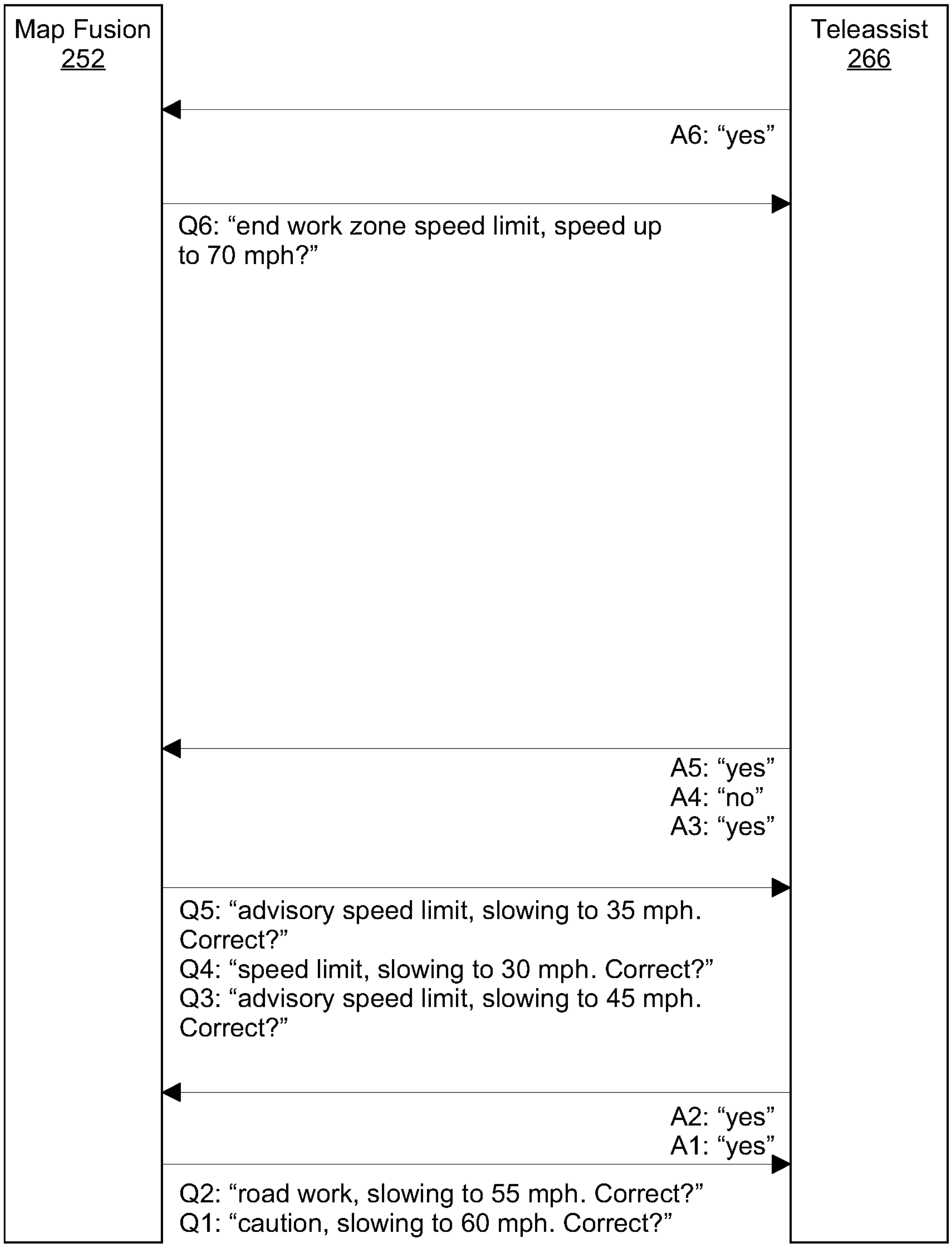
FIG. 9 is a block diagram illustrating an example interaction between the map fusion component and the teleassist system in the system of FIG. 4 using a road sign validation approach during autonomous vehicle travel through the environment of FIG. 6.
Figure 10:
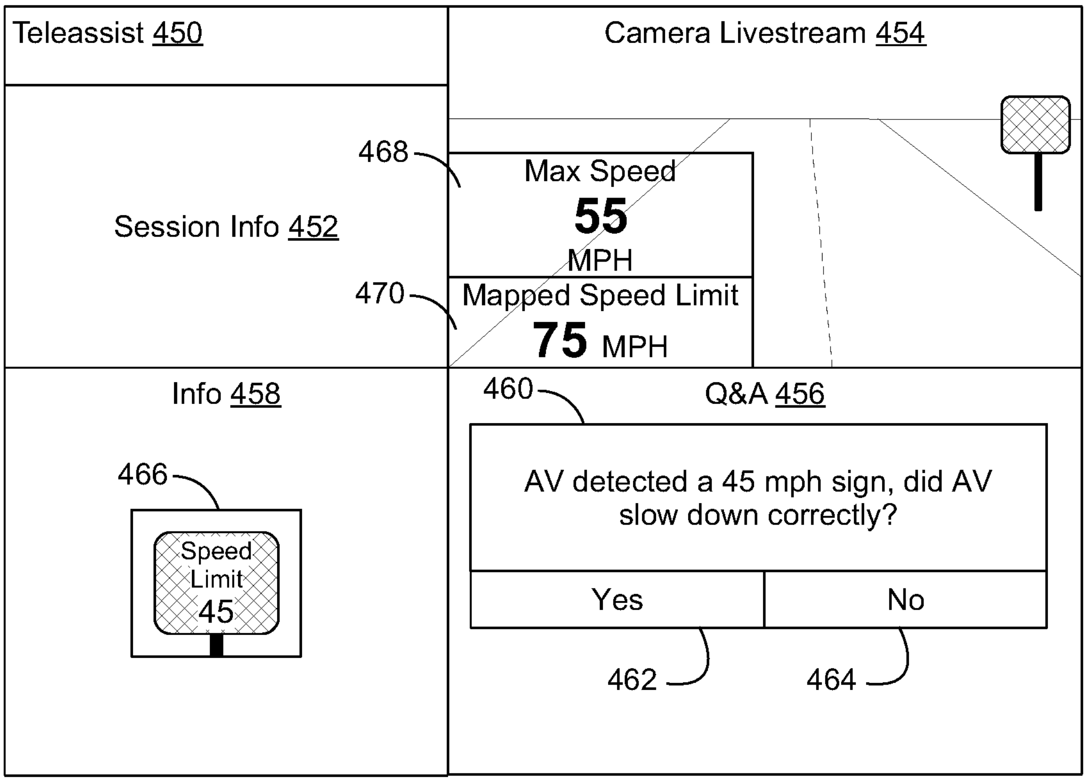
FIG. 10 is a block diagram of an example user interface usable in the system of FIG. 4 when using a sign validation approach.

FIGS. 9-10 illustrate the aforementioned sign validation approach, with FIG. 9 illustrating a set of questions (Q1-Q6) sent by map fusion component 252 to remote teleassist system 266 upon encountering the road signs illustrated in FIG. 6, along with a set of corresponding answers (A1-A6) provided as feedback by a teleassist operator to map fusion component 252. FIG. 10 in turn illustrates an example teleassist system user interface 450 that may be displayed to a teleassist operator during a teleassist session to provide situational awareness to the teleassist operator and allow for feedback to be provided to the autonomous vehicle by the teleassist operator. As noted above, in contrast with the speed limit modulation approach of FIGS. 7-8 where notifications are generated by the autonomous vehicle and commands are selectively provided by a teleassist operator in response to the notifications in order to instruct the autonomous vehicle to take certain actions, in the sign validation approach, the autonomous vehicle poses questions to the teleassist operator and the teleassist operator answers with either confirmations or rejections of the questions, or in some instances, alternative suggested actions to be taken by the autonomous vehicle.

Thus, for example, it may be desirable in some implementations for map fusion component 252 to provide teleassist system 266 with one or more of a question identifier, a sign type, whether the road sign is mapped, a speed limit inferred from the road sign (if applicable), a mapped speed limit, a current online speed limit, a timestamp and/or location and bounding box to get a road sign snapshot for visualization, a question text (e.g. "can the autonomous vehicle speed up to 75 mph?"), and/or a list of appropriate answer texts (e.g. "Yes", "No", "set speed limit to XX mph", etc.). Conversely, a teleassist system 266 may provide back to an map fusion component 252 one or more of a question identifier, an answer index, potential answer metadata (e.g. setting a custom speed limit) and/or a timestamp.

User interface 450, for example, may include a number of panels 452-458 displaying various types of information to the teleassist operator. Panel 452 displays information about the teleassist session, including, for example, operator ID, vehicle ID, session ID, session start time and/or duration, etc. Panel 404 displays situational awareness information forwarded by the autonomous vehicle, e.g., a live camera feed from the vehicle.

Panel 456 displays a questions and answer interface through which the autonomous vehicle poses questions to the teleassist operator and the teleassist operator provides answers thereto. In order to provide an operator with additional situational awareness, an additional information panel 458 may be used.

Panel 456, for example, illustrates an example user interface control 460 displayed to a teleassist operator including a question generated by the autonomous vehicle ("AV detected a 45 mph sign, did AV slow down correctly?"), along with user controls (e.g., yes and no buttons 462, 464) enabling a teleassist operator to generate an appropriate answer to the question. Moreover, as illustrated at 466, additional information associated with the question, e.g., a cropped image of the sign that was detected by the autonomous vehicle, may also be displayed to enable the operator to make a more informed decision.

In addition, it may be desirable in some instances to include additional contextual information to an operator, e.g., the current speed limit set for the autonomous vehicle (control 468) and the mapped speed limit (control 470) as specified by the map database used by the autonomous vehicle.

Returning to FIG. 9, and with additional reference to FIG. 6, assume that the autonomous vehicle 352 is a tractor trailer and operating with a speed limit of 70 mph on roadway 354 with a mapped speed limit of 75 mph. It may also be assumed that the road signs 360-374, being associated with a construction zone, are unmapped signs, and thus, upon encountering the road signs, the autonomous vehicle will initiate a teleassist session with remote teleassist system 266. As illustrated in FIG. 9, upon encountering the first cluster of road signs 360-364, road sign 362 may generate a first question Q1 ("caution, slowing to 60 mph. Correct?") and road sign 360 may generate a second question Q2 ("road work, slowing to 55 mph. Correct?"), both advising the teleassist operator of the unmapped signs, and indicating the speed limit to which the autonomous vehicle is autonomously reducing its speed (as described above in connection with blocks 312-314 of FIG. 5). In response to these questions, the teleassist operator may determine that the autonomous vehicle has reacted appropriately and confirmed each question with an associated answer "yes" (answers A1, A2).

Upon encountering the second cluster of road signs 366-372, the autonomous vehicle may issue three additional questions Q3-Q5. Question Q3 indicates that an advisory road sign with a speed limit of 45 mph (road sign 366) has been detected, and that the autonomous vehicle is slowing to 45 mph. Question Q4 indicates that a road sign with a speed limit of 30 mph (road sign 372) has been detected, and that the autonomous vehicle is slowing to 30 mph. Question Q5 indicates that an advisory road sign with a speed limit of 35 mph (road sign 368) has been detected, and that the autonomous vehicle is setting the speed limit to 35 mph. As noted above, the autonomous vehicle has misinterpreted road sign 372, which specifies a weight limit of 30 tons, as a speed limit sign, while the autonomous vehicle has not necessarily determined whether the condition of road sign 368 ("when towing") applies to the vehicle. Due to the conflicting information presented by road signs 366, 368 and 372, a teleassist operator may then issue answers A3-A5 to questions Q3-Q5, answering "yes" to questions Q3 and Q5 and answering "no" to question Q4. As a result of these responses, the autonomous vehicle will set a speed limit of 35 mph.

Later, when the autonomous vehicle encounters road sign 374, indicating the end of the work zone, a question Q6 may be generated ("end work zone speed limit, speed up to 70 mph?"), and in response, the teleassist operator may answer "yes" in answer A6, and the autonomous vehicle resumes the normal speed of 70 mph.

Figure 11:
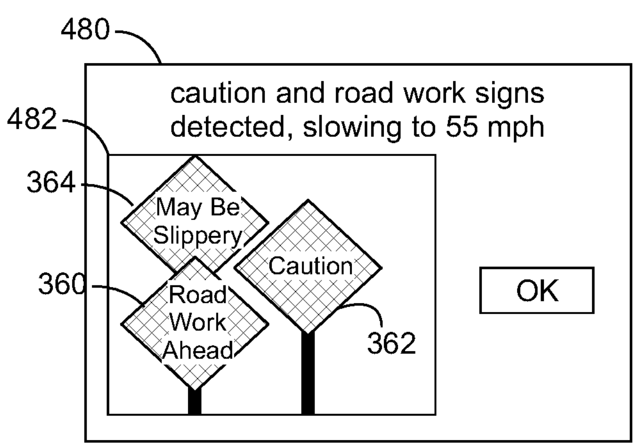
FIG. 11 is a block diagram of an example aggregated notification that may be generated in the system of FIG. 4.

While individual road signs may trigger individual notifications or questions in some implementations, in other implementations, it may be desirable to aggregate multiple notifications or questions, particularly when multiple road signs are clustered or encountered in close proximity to one another. FIG. 11, for example, illustrates an example aggregated notification 480 that may aggregate the notifications N1 and N2 from FIG. 7. In such instances, it may also be desirable to aggregate images of the associated road signs, e.g., as illustrated by image 482, which has been cropped from the camera image to display signs 360-364 of FIG. 6. Where cropping all of the road signs together is not optimal or feasible, multiple images of the individual road signs may be displayed in the alternative, and in some instances, the images may be presented in a predetermined sequence to enable a teleassist operator to determine the order in which the road signs appeared.

Other approaches and/or user interfaces may be used in other implementations. For example, the aforementioned approaches may be combined in some implementations, e.g., by presenting answerable questions to a teleassist operator while also providing an ability for a teleassist operator to separately suggest a specific speed limit. In addition, it may be desirable to provide separate notifications to a teleassist operator, e.g., to notify a teleassist operator when it is suitable to terminate a session (e.g., when the autonomous vehicle has returned to the normal mapped environment after a construction zone), or to suggest that the teleassist operator maintain an active session when it is expected that further monitoring may be useful.

Thus, it will be appreciated that in some implementations, the autonomous vehicle may be allowed to operate in a manner that is "nominally" correct, e.g., adjusting its speed limit according to detected road signs, yet also incorporate teleassist operator approval or suggested alternative operations for edge cases, e.g., where road signs are misinterpreted or where due to a variety of factors, the "correct" operation is not self-evident. Moreover, when an autonomous vehicle enters a construction zone, where a high likelihood exists that additional assistance may be needed, e.g., due to the presence of other potentially-confusing road signs or an inability to detect an end of a construction zone due to a lack of suitable markings, it may be beneficial to maintain an active teleassist session throughout at least a portion of the construction zone.

It will be appreciated that, while certain features may be discussed herein in connection with certain implementations and/or in connection with certain figures, unless expressly stated to the contrary, such features generally may be incorporated into any of the implementations discussed and illustrated herein. Moreover, features that are disclosed as being combined in some implementations may generally be implemented separately in other implementations, and features that are disclosed as being implemented separately in some implementations may be combined in other implementations, so the fact that a particular feature is discussed in the context of one implementation but not another should not be construed as an admission that those two implementations are mutually exclusive of one another. Other variations will be apparent to those of ordinary skill. Therefore, the invention lies in the claims hereinafter appended.

What is claimed is:

1. An autonomous vehicle control system comprising one or more processors configured to operate an autonomous vehicle in an environment by:

detecting a road sign in the environment from sensor data captured by a sensor disposed on the autonomous vehicle while the autonomous vehicle is operating on a roadway;

while the autonomous vehicle is operating on the roadway, accessing a database storing sign data for a plurality of road signs in the environment within which the autonomous vehicle is operated to determine that the detected road sign is not stored in the database; and while the autonomous vehicle is operating on the roadway, and in response to determining that the detected road sign is not stored in the database, initiating a teleassist session with a remote teleassist system to receive remote teleassist operator input that suggests a vehicle control operation to control operation of the autonomous vehicle to comply with the detected road sign;

wherein the one or more processors are configured to communicate a notification for the detected road sign to the remote teleassist system during the teleassist session to provide situational awareness about the detected road sign to a teleassist operator of the remote teleassist system;

wherein the detected road sign is a first detected road sign, the notification is a first notification and the one or more processors are further configured to detect a second road sign in the environment proximate the first detected road sign, and to communicate a sequence of the first notification and a second notification for the second detected road sign to the remote teleassist system during the teleassist session.

2. The autonomous vehicle control system of claim 1, wherein the one or more processors are further configured to execute the vehicle control operation suggested by the teleassist operator input received from the remote teleassist system.

3. The autonomous vehicle control system of claim 1, wherein the sensor data includes an image captured from a field of view of the sensor, wherein the one or more processors are further configured to, after initiating the teleassist session, communicate at least a portion of the image to the remote teleassist system.

4. The autonomous vehicle control system of claim 3, wherein the one or more processors are further configured to crop the image to generate a cropped image including the first detected road sign, and to communicate the at least a portion of the image to the remote teleassist system by communicating the cropped image to the remote teleassist system.

5. The autonomous vehicle control system of claim 1, wherein the one or more processors are configured to determine a speed limit associated with the first detected road sign that is lower than a current speed limit set for the autonomous vehicle, and to lower the current speed limit for the autonomous vehicle based upon the determined speed limit associated with the first detected road sign.

6. The autonomous vehicle control system of claim 1, wherein the first detected road sign does not explicitly specify a speed limit, and the one or more processors are configured to determine a cautionary condition associated with the first detected road sign, and to lower a current speed limit for the autonomous vehicle based upon the determined cautionary condition associated with the first detected road sign.

7. The autonomous vehicle control system of claim 6, wherein the one or more processors are configured to notify the remote teleassist system of the lowering of the current speed limit.

8. The autonomous vehicle control system of claim 7, wherein the one or more processors are configured to notify the remote teleassist system by generating a notification identifying the first detected road sign and the speed limit to which the autonomous vehicle is being lowered.

9. The autonomous vehicle control system of claim 8, wherein the vehicle control operation suggested by the remote teleassist operator input specifies a speed limit to which the autonomous vehicle is to be set.

10. The autonomous vehicle control system of claim 7, wherein the one or more processors are configured to notify the remote teleassist system by generating a question identifying the first detected road sign and the speed limit to which the autonomous vehicle is being lowered.

11. The autonomous vehicle control system of claim 10, wherein the remote teleassist operator input answers the question by confirming, rejecting, or modifying the lowering of the speed limit to which the autonomous vehicle is being lowered.

12. The autonomous vehicle control system of claim 1, wherein the one or more processors are configured to determine a speed limit associated with the first detected road sign and to notify the remote teleassist system of the determined speed limit, and wherein the vehicle control operation suggested by the remote teleassist operator input specifies a speed limit to which the autonomous vehicle is to be set.

13. The autonomous vehicle control system of claim 1, wherein the one or more processors are configured to determine a speed limit associated with the first detected road sign and to notify the remote teleassist system of the determined speed limit, and wherein the remote teleassist operator input confirms or rejects the determined speed limit.

14. The autonomous vehicle control system of claim 1, wherein the one or more processors are configured to maintain the teleassist session with the remote teleassist system active until receiving remote teleassist operator input to close the teleassist session.

15. The autonomous vehicle control system of claim 1, wherein the one or more processors are configured to:

detect a third road sign in the environment;

determine from the database that the third detected road sign is stored in the database;

determine that a speed limit for the third detected road sign is greater than a current speed limit set for the autonomous vehicle; and request confirmation from the remote teleassist system to increase the current speed limit for the autonomous vehicle to that of the third detected road sign.

16. A method of operating an autonomous vehicle in an environment, comprising:

detecting a road sign in the environment from sensor data captured by a sensor disposed on the autonomous vehicle while the autonomous vehicle is operating on a roadway;

while the autonomous vehicle is operating on the roadway, accessing a database storing sign data for a plurality of road signs in the environment within which the autonomous vehicle is operated to determine that the detected road sign is not stored in the database;

while the autonomous vehicle is operating on the roadway, and in response to determining that the detected road sign is not stored in the database, initiating a teleassist session with a remote teleassist system to receive remote teleassist operator input that suggests a vehicle control operation to control operation of the autonomous vehicle to comply with the detected road sign; and communicating a notification for the detected road sign to the remote teleassist system during the teleassist session to provide situational awareness about the detected road sign to a teleassist operator of the remote teleassist system;

wherein the detected road sign is a first detected road sign, the method further comprises detecting a second road sign in the environment proximate the first detected road sign, and the notification is an aggregated notification for both of the first and second detected road signs.

17. A teleassist system that is remote to an autonomous vehicle operating in an environment, the teleassist system comprising one or more processors configured to:

create a teleassist session with the autonomous vehicle in response to receiving a request from the autonomous vehicle triggered in response to the autonomous vehicle detecting a road sign in the environment from sensor data captured by a sensor disposed on the autonomous vehicle while the autonomous vehicle is operating on a roadway and determined, while the autonomous vehicle is operating on the roadway, to be an unmapped road sign that is not stored in a database of the autonomous vehicle;

provide a teleassist operator with situational awareness information associated with the detected road sign using a user interface; and while the autonomous vehicle is operating on the roadway, and in response to user input from the teleassist operator through the user interface, communicate to the autonomous vehicle teleassist operator input that suggests a vehicle control operation to control operation of the autonomous vehicle to comply with the detected road sign;

wherein the one or more processors are configured to receive a notification for the detected road sign from the autonomous vehicle during the teleassist session to provide situational awareness about the detected road sign to the teleassist operator;

wherein the detected road sign is a first detected road sign, the notification is a first notification and the one or more processors are further configured to receive a sequence of the first notification and a second notification for a second road sign from the autonomous vehicle during the teleassist session, the second road sign detected by the autonomous vehicle in the environment proximate the first detected road sign.

18. The teleassist system of claim 17, wherein the user input from the teleassist operator confirms the first detected road sign, rejects the first detected road sign, or specifies a speed limit to which the autonomous vehicle is to be set.

* * * * *